United States Patent
Hsu

(10) Patent No.: US 8,079,563 B2
(45) Date of Patent: Dec. 20, 2011

(54) ELEVATING MECHANISM WITH AN ELASTICITY COMPENSATIVE FUNCTION AND RELATED DISPLAY DEVICE

(75) Inventor: Wei-Hsin Hsu, Taipei County (TW)

(73) Assignee: Qisda Corporation, Taoyuan County (TW)

( * ) Notice: Subject to any disclaimer, the term of this patent is extended or adjusted under 35 U.S.C. 154(b) by 752 days.

(21) Appl. No.: 12/187,380

(22) Filed: Aug. 7, 2008

(65) Prior Publication Data
US 2009/0039211 A1 Feb. 12, 2009

(30) Foreign Application Priority Data

Aug. 10, 2007 (TW) ................................ 96129620 A

(51) Int. Cl.
*F16M 11/00* (2006.01)
*F16M 13/00* (2006.01)

(52) U.S. Cl. ........ 248/404; 248/599; 248/602; 248/161; 248/157; 248/917; 108/147.19; 361/679.05; 403/109.1

(58) Field of Classification Search .................. 248/917, 248/919, 920, 924, 161, 162.1, 404, 157, 248/132, 125.1, 125.2, 125.8, 414, 188.5, 248/565, 602, 669, 599, 188.2, 327, 274.1, 248/295.11; 403/109.1, 109.5; 108/147.19, 108/147; 361/679.05
See application file for complete search history.

(56) References Cited

U.S. PATENT DOCUMENTS

| 441,393 | A | * | 11/1890 | Bryant | 248/162.1 |
|---|---|---|---|---|---|
| 1,852,785 | A | * | 4/1932 | Moehler | 403/109.3 |
| 4,650,145 | A | * | 3/1987 | Natzel et al. | 248/414 |
| 6,712,321 | B1 | * | 3/2004 | Su et al. | 248/123.11 |
| 6,796,537 | B1 | * | 9/2004 | Lin | 248/162.1 |
| 6,923,410 | B2 | * | 8/2005 | Chang | 248/188.5 |
| 6,951,185 | B1 | * | 10/2005 | Wiese | 116/173 |
| 6,997,422 | B2 | * | 2/2006 | Sweere et al. | 248/123.11 |
| 2002/0088910 | A1 | * | 7/2002 | Sweere et al. | 248/286.1 |
| 2006/0219849 | A1 | * | 10/2006 | Chiu | 248/125.8 |
| 2007/0034756 | A1 | * | 2/2007 | Tsai et al. | 248/161 |

\* cited by examiner

*Primary Examiner* — Kimberly Wood

(57) ABSTRACT

An elevating mechanism includes a sleeve having a first end and a second end, and an elevating component installed inside the sleeve and having a third end and a fourth end. When the elevating component is located in a first position relative to the sleeve, a main spring is compressed by the elevating component at a first deformation. When the component is located in a second position relative to the sleeve, the main spring is compressed by the elevating component at a second deformation. The first deformation is greater than the second deformation. When the elevating component is located in the first position relative to the sleeve, a complementary spring is compressed at a third deformation. When the component is located in the second position relative to the sleeve, the complementary spring is compressed at a fourth deformation. The third deformation is greater than the fourth deformation.

11 Claims, 9 Drawing Sheets

ELEVATING MECHANISM WITH AN ELASTICITY COMPENSATIVE FUNCTION AND RELATED DISPLAY DEVICE

BACKGROUND OF THE INVENTION

1. Field of the Invention

The present invention relates to an elevating mechanism and a related display device, and more particularly, to an elevating mechanism with an elasticity compensative function and a related display device.

2. Description of the Prior Art

Flat panel displays (FPDs) have been most widely utilized in display devices as a replacement for the cathode ray tube (CRT). This is true for several reasons, for example, due to features of excellent picture quality, lightweight, thin size, and low power consumption.

Generally, an elevating mechanism is provided for users to adjust a height of a screen. Please refer to FIG. 1. FIG. 1 is a diagram of a display device 10 in the prior art. The display device 10 includes a screen 12 which can be a liquid crystal display, an elevating mechanism 14 connected to the screen 12, and a base 16 connected to the elevating mechanism 14 and installed on a bottom of the display device 10 for supporting the elevating mechanism 14. The elevating mechanism 14 is used for adjusting a vertical distance between the screen 12 and the base 16 so as to adjust the height of the screen 12. The elevating mechanism 14 includes a fixing component 18, an elevating component 20 connected to the screen 12 and installed inside the fixing component 18 in a movable manner relative to the fixing component 18, and a constant force spring 22. One end of the constant force spring 22 is connected to the fixing component 18, and the other end of the constant force spring 22 is connected to the elevating component 20. The screen can be fixed in a certain height by static equilibrium of gravity of the screen 12 and an elastic restoring force of the constant force spring 22 so that users can adjust the screen 12 with the same force smoothly. However mechanical design of the constant force spring 22 is complicated and cost of the constant force spring 22 is high. There is a need to find a mechanism for simulating the constant force spring 22 with simply structure and low cost.

SUMMARY OF THE INVENTION

It is therefore a primary objective of the claimed invention to provide an elevating mechanism with an elasticity compensative function and a related display device for solving the above-mentioned problem.

According to the claimed invention, an elevating mechanism includes a sleeve having a first end and a second end, and an elevating component installed inside the sleeve in a movable manner relative to the sleeve. The elevating component includes a third end and a fourth end. A first distance between the first end of the sleeve and the third end of the elevating component is larger than a second distance between the second end of the sleeve and the fourth end of the elevating component. The elevating mechanism further includes a main spring connected to the sleeve and the elevating component. The main spring is compressed by the elevating component at a first deformation when the elevating component is located in a first position relative to the sleeve, and the main spring is compressed by the elevating component at a second deformation when the component is located in a second position relative to the sleeve. The first deformation is larger than the second deformation. The elevating mechanism further includes a complementary spring having a fifth end contacting with an inner side of the sleeve and a sixth end contacting with the elevating component. The complementary spring is compressed at a third deformation when the elevating component is located in the first position relative to the sleeve. The complementary spring is compressed at a fourth deformation when the component is located in the second position relative to the sleeve. The third deformation is greater than the fourth deformation.

According to the claimed invention, a display device includes a screen, and an elevating mechanism connected to the screen for elevating the screen. The elevating mechanism includes a sleeve having a first end and a second end, and an elevating component installed inside the sleeve in a movable manner relative to the sleeve. The elevating component includes a third end and a fourth end. A first distance between the first end of the sleeve and the third end of the elevating component is larger than a second distance between the second end of the sleeve and the fourth end of the elevating component. The elevating mechanism further includes a main spring connected to the sleeve and the elevating component. The main spring is compressed by the elevating component at a first deformation when the elevating component is located in a first position relative to the sleeve, and the main spring is compressed by the elevating component at a second deformation when the component is located in a second position relative to the sleeve. The first deformation is larger than the second deformation. The elevating mechanism further includes a complementary spring having a fifth end contacting with an inner side of the sleeve and a sixth end contacting with the elevating component. The complementary spring is compressed at a third deformation when the elevating component is located in the first position relative to the sleeve. The complementary spring is compressed at a fourth deformation when the component is located in the second position relative to the sleeve. The third deformation is greater than the fourth deformation.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
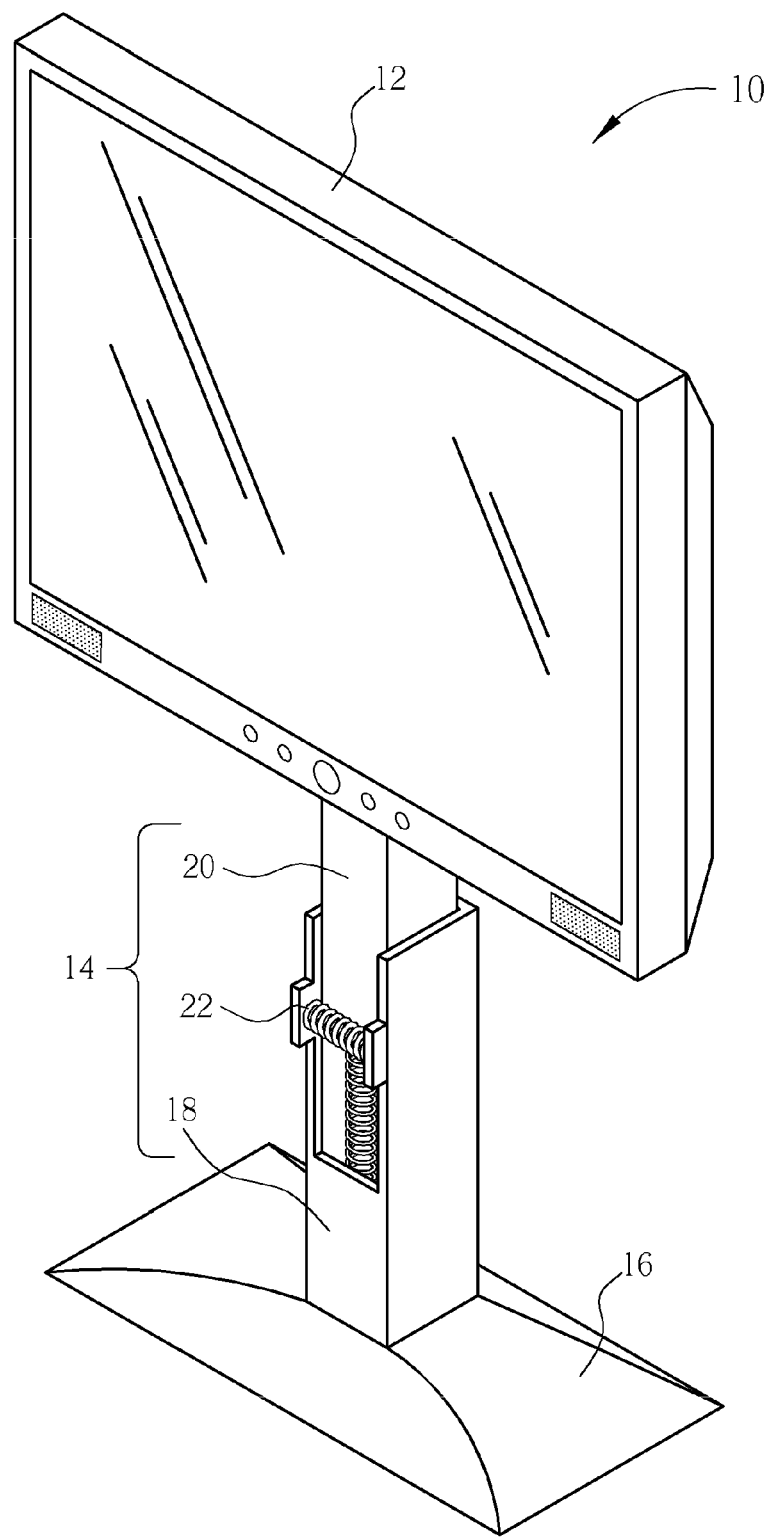
FIG. 1 is a diagram of a display device in the prior art.
Figure 2:
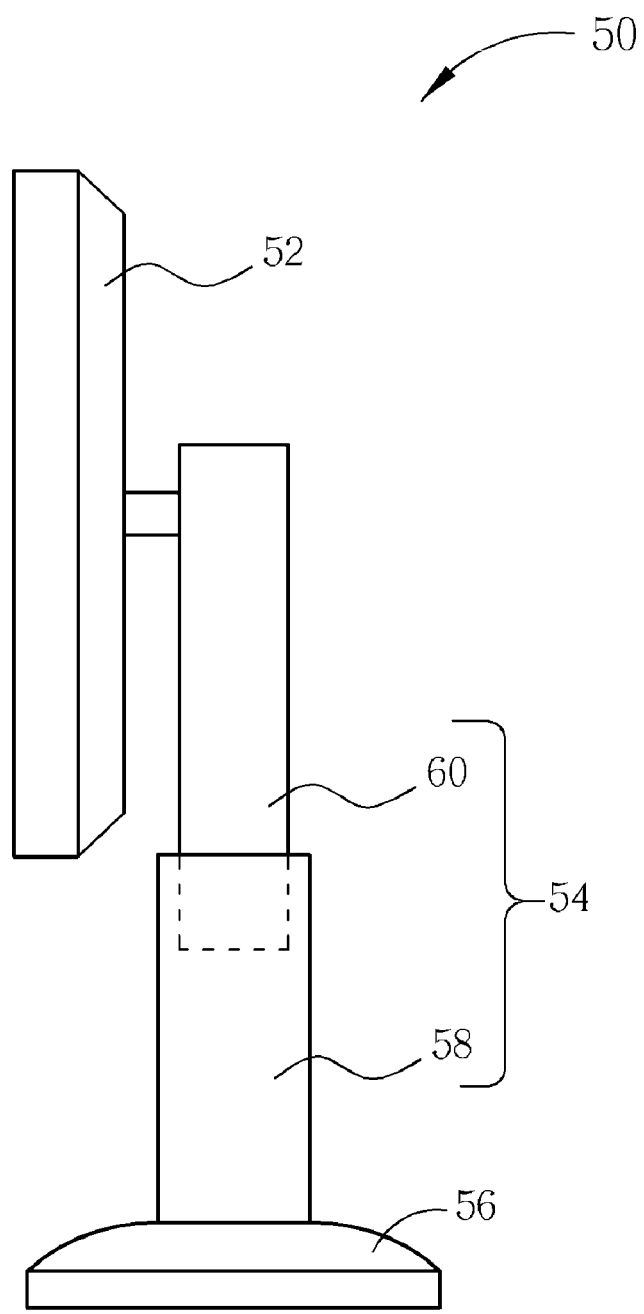
FIG. 2 is a diagram of a display device according to an embodiment of the present invention.

Please refer to FIG. 2. FIG. 2 is a diagram of a display device 50 according to an embodiment of the present invention. The display device 50 includes a screen 52 which can be a liquid crystal display, an elevating mechanism 54 connected to the screen 52, and a base 56 connected to the elevating mechanism 52 and installed on a bottom of the display device 50 for supporting the elevating mechanism 54. The elevating mechanism 54 is used for adjusting a vertical distance between the screen 52 and the base 56 so as to adjust the height of the screen 52.

Figure 3:
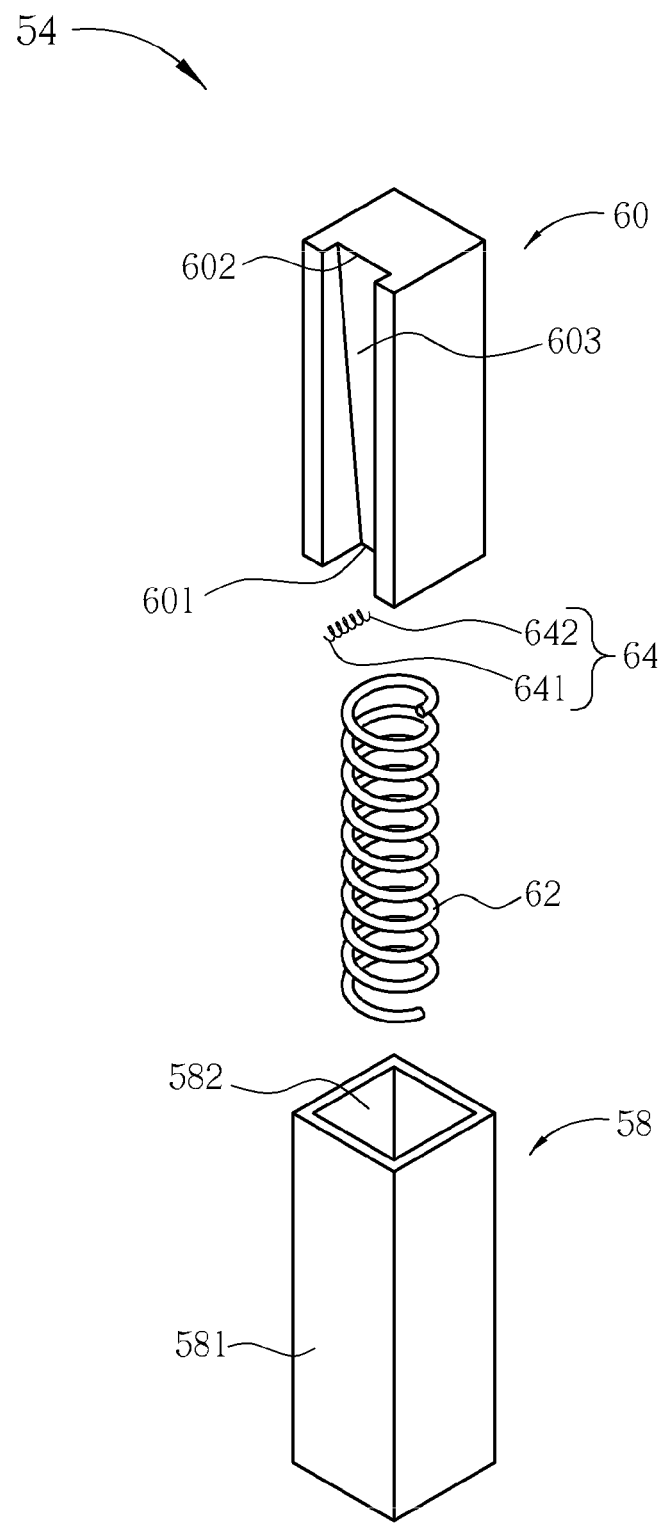
FIG. 3 is an exploded diagram of an elevating mechanism according to the embodiment of the present invention.

Please refer to FIG. 3. FIG. 3 is an exploded diagram of the elevating mechanism 54 according to the embodiment of the present invention. The elevating mechanism 54 includes a sleeve 58 having a first end 581 and a second end 582, and an elevating component 60 connected to the screen 52 and installed inside the sleeve 58 in a movable manner relative to the sleeve 58. The elevating component 60 has a third end 601 and a fourth end 602. A first distance between the first end 581 of the sleeve 58 and the third end 601 of the elevating component 60 is larger than a second distance between the second end 582 of the sleeve 58 and the fourth end 602 of the elevating component 60. An incline 603 is disposed between the third end 601 and the fourth end 602 of the elevating component 60, and the width from the third end 601 to the fourth end 602 of the elevating component 60 is getting larger. The elevating mechanism 54 further includes a main spring 62 connected to the sleeve 58 and the elevating component 60, and a complementary spring 64 having a fifth end 641 fixed on an inner side of the sleeve 58 and a sixth end 642 contacting with the incline 603 of the elevating component 60 freely. The main spring 62 and the complementary spring 64 can be linear springs conforms to Hooke's Law.

Figure 4:
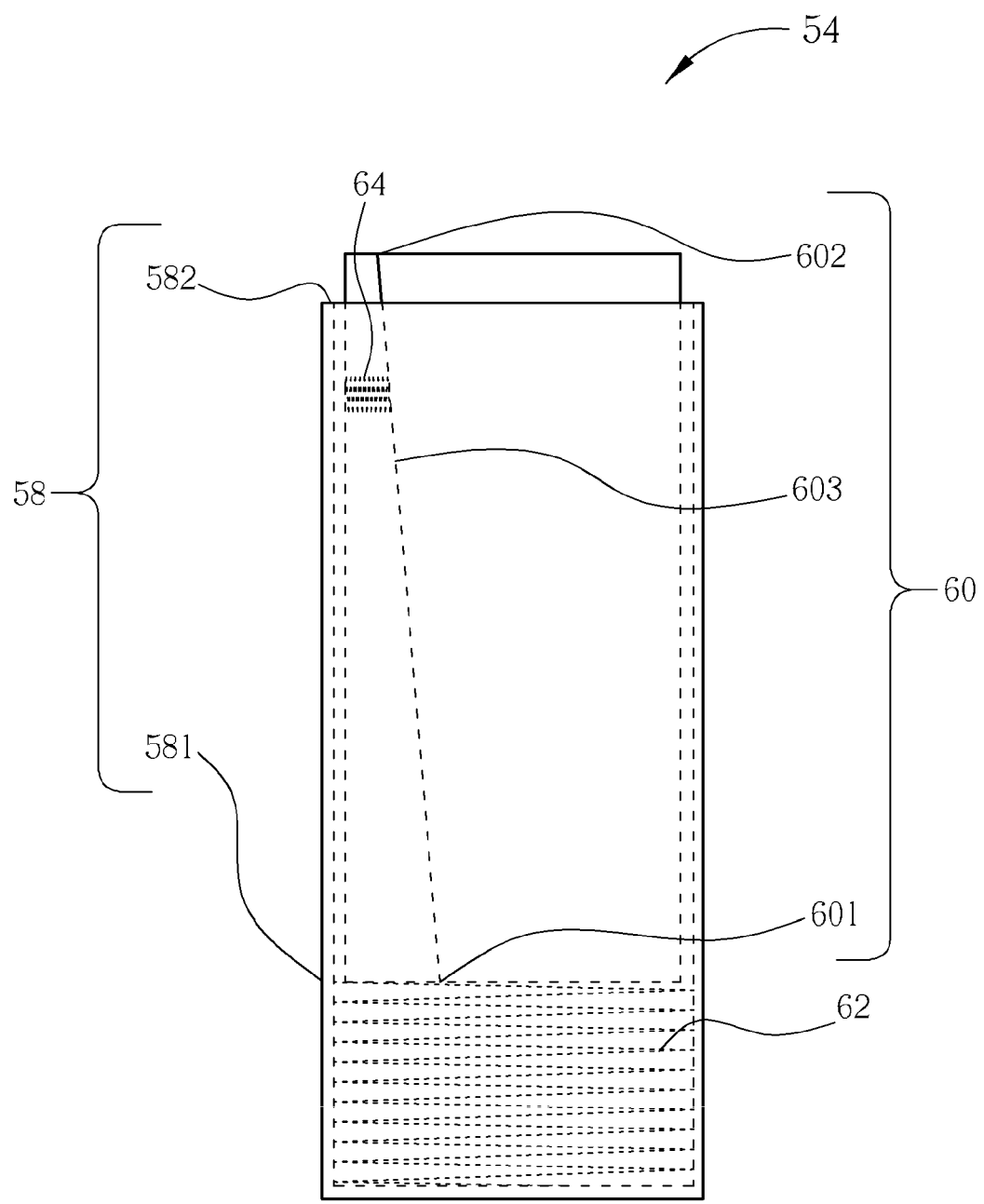
FIG. 4 is a diagram of an elevating component located in a first position relative to a sleeve according to the embodiment of the present invention.
Figure 5:
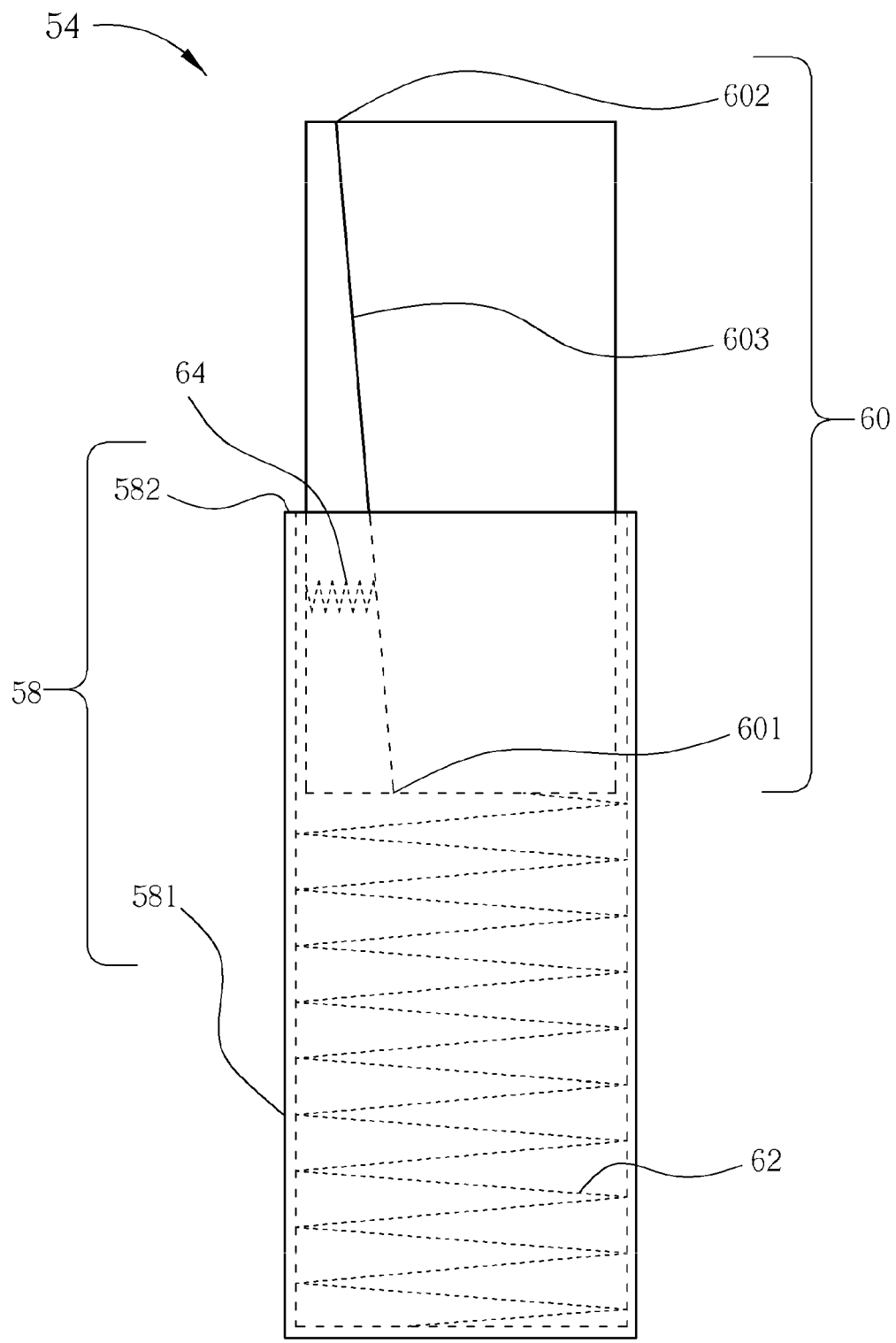
FIG. 5 is a diagram of the elevating component located in a second position relative to the sleeve according to the embodiment of the present invention.

Please refer to FIG. 4 and FIG. 5. FIG. 4 is a diagram of the elevating component 60 located in a first position relative to the sleeve 58 according to the embodiment of the present invention. FIG. 5 is a diagram of the elevating component 60 located in a second position relative to the sleeve 58 according to the embodiment of the present invention. As shown in FIG. 4, when the elevating component 60 descends to the first position relative to the sleeve 58, the main spring 62 is compressed at a first deformation and the complementary spring 64 is compressed at a third deformation. As shown in FIG. 5, when the elevating component 60 lifts to the second position relative to the sleeve 58, the main spring 62 is compressed at a second deformation and the complementary spring 64 is compressed at a fourth deformation. Because the main spring 62 and the complementary spring 64 are compressed relative to original conditions, the first deformation is larger than the second deformation of the main spring 62. Because the width of the elevating component 60 is getting larger from the bottom to the top thereof, that is, the width from the third end 601 to the fourth end 602 is getting larger so that the first distance between the first end 581 of the sleeve 58 and the third end 601 of the elevating component 60 is larger than the second distance between the second end 582 of the sleeve 58 and the fourth end 602 of the elevating component 60 and the complementary spring 64 is disposed between the incline 603 of the elevating component 60 and the sleeve 58, the third deformation is larger than the fourth deformation of the complementary spring 64. In other words, when the elevating component 60 descends relative to the sleeve 58, the elastic deformations of the main spring 62 and the complementary spring 64 increase gradually. When the elevating component 60 lifts relative to the sleeve 58, the elastic deformations of the main spring 62 and the complementary spring 64 decrease gradually.

Figure 6:
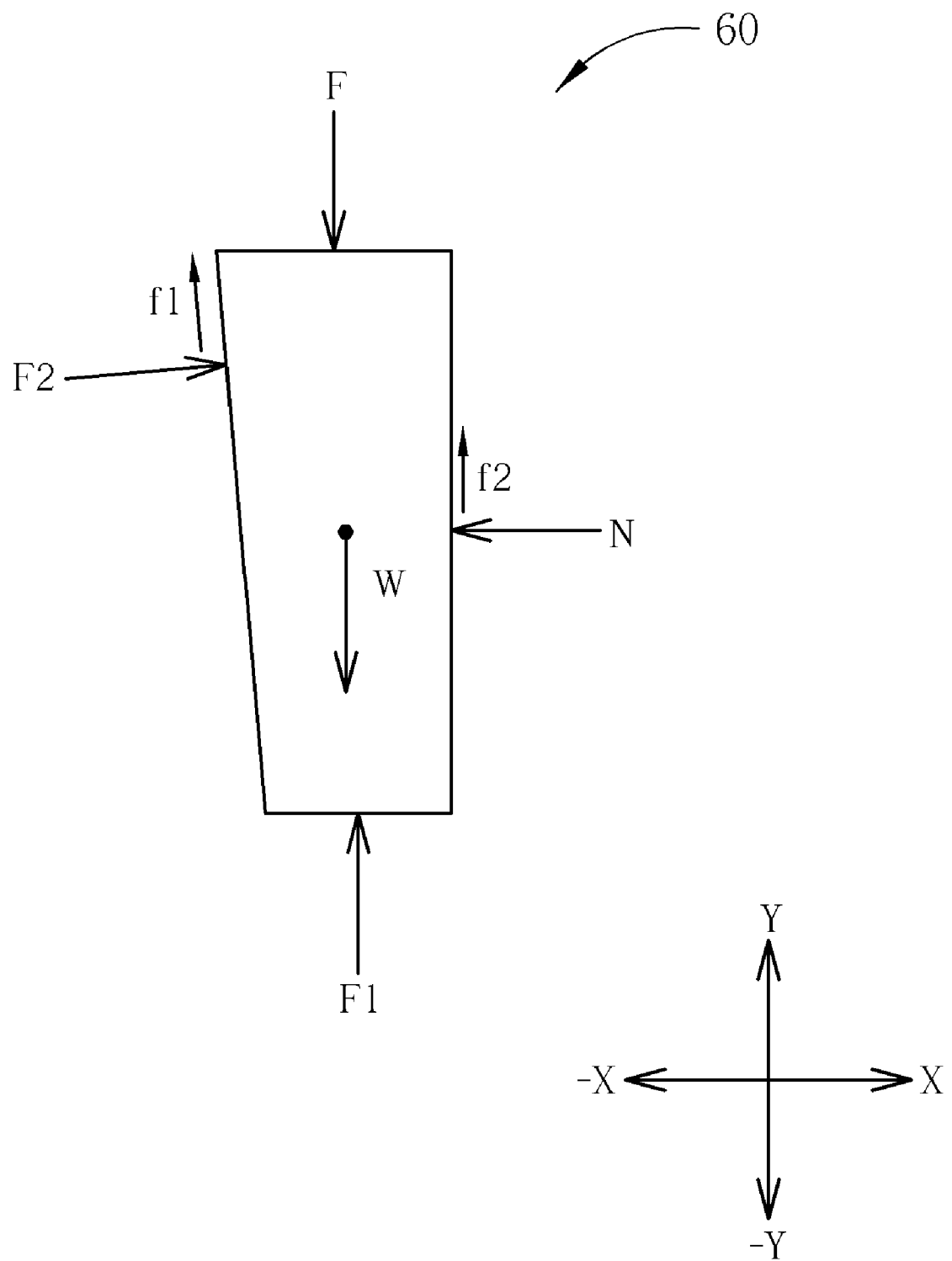
FIG. 6 is a force diagram of the elevating component descending to the first position according to the embodiment of the present invention.
Figure 7:
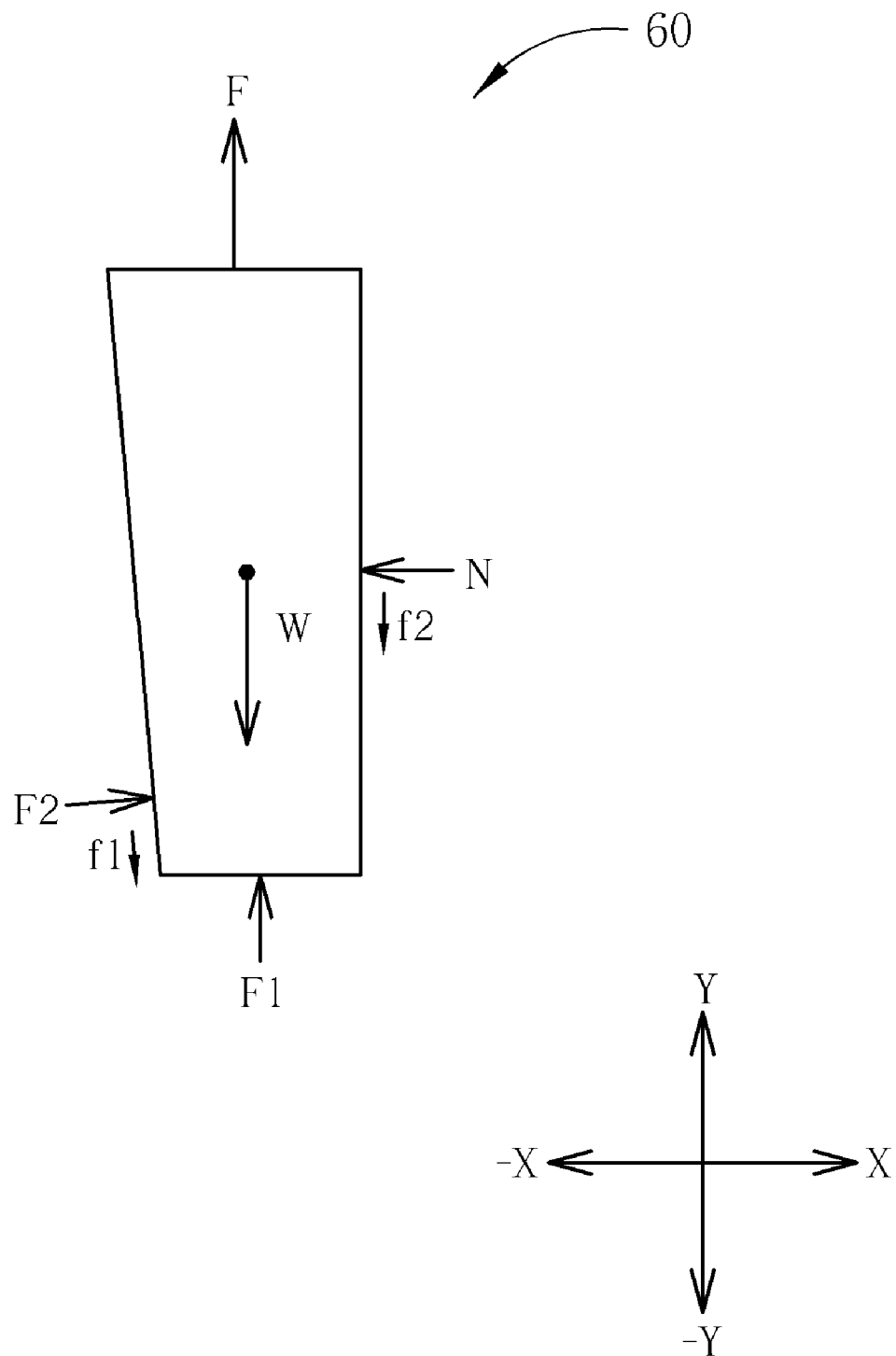
FIG. 7 is a force diagram of the elevating component lifting to the second position according to the embodiment of the present invention.

Please refer to FIG. 6 and FIG. 7. FIG. 6 is a force diagram of the elevating component 60 descending to the first position according to the embodiment of the present invention. FIG. 7 is a force diagram of the elevating component 60 lifting to the second position according to the embodiment of the present invention. The forces applied to the elevating component 60 essentially include gravity of the elevating component W, an elastic restoring force F1 of the main spring 62, an elastic restoring force F2 of the complementary spring 64, friction forces f1, f2 between the sleeve 58 and the elevating component 60, an normal force N provided by the sleeve 58, and an external force F for lifting or descending the elevating component 60. The friction force f1 between the sleeve 58 and the elevating component 60 relates with the elastic restoring force F2 of the complementary spring 64, and the friction force f2 between the sleeve 58 and the elevating component 60 relates with the normal force N provided by the sleeve 58. That is, when the elastic restoring force F2 of the complementary spring 64 and the normal force N provided by the sleeve 58 increase, the friction forces f1, f2 between the sleeve 58 and the elevating component 60 increase, and vice versa. As shown in FIG. 6, when the elevating component 60 descends in −Y direction so as to descend the screen 52, the deformations of the main spring 62 and the complementary spring 64 increase accordingly and the elastic restoring force F1 of the main spring 62 in Y direction and the elastic restoring force F2 of the complementary spring 64 increase gradually so that the friction forces f1, f2 between the sleeve 58 and the elevating component 60 in Y direction increase gradually and resistant force of lifting the elevating component 60 increases. In addition, as shown in FIG. 7, when the elevating component 60 lifts in Y direction so as to lift the screen 52, the deformations of the main spring 62 and the complementary spring 64 decrease accordingly and the elastic restoring force F1 of the main spring 62 in Y direction and the elastic restoring force F2 of the complementary spring 64 decrease gradually so that the friction forces f1, f2 between the sleeve 58 and the elevating component 60 in Y direction decrease gradually and resistant force of lifting the elevating component 60 decreases. In conclusion, when the elevating component 60 lifts from the first position shown in FIG. 4 to the second position shown in FIG. 5, the elastic restoring force F1 of the main spring 62 decreases gradually and the elastic restoring force F2 of the complementary spring 64 and the normal force N provided by the sleeve 58 decrease simultaneously so that the friction forces f1, f2 between the sleeve 58 and the elevating component 60 of lifting the elevating component 60 decrease so as to keep the external force F for lifting the elevating component 60 constant. On the contrary, when the elevating component 60 descends from the second position shown in FIG. 5 to the first position shown in FIG. 4, the elastic restoring force F1 of the main spring 62 increases gradually and the elastic restoring force F2 of the complementary spring 64 and the normal force N provided by the sleeve 58 increase simultaneously so that the friction forces f1, f2 between the sleeve 58 and the elevating component 60 of descending the elevating component 60 increase so as to keep the external force F for descending the elevating component 60 constant. The friction forces f1, f2 as an elasticity compensative mechanism for the elastic restoring force F1 of the main spring 62 by synchronal change of the elastic restoring forces of the main spring 62 and the complementary spring 64 provide users for adjusting the height of the screen 52 with a constant force smoothly. Besides, a plurality of complementary springs can be used as the elasticity compensative mechanism, and another incline can be disposed on the opposite side with respect to the incline 603 of the elevating component 60 and the complementary springs 64 are installed on both sides of the elevating component 60 as the elasticity compensative mechanism. The working principle is the same as the above-mentioned embodiment, and detailed description is hereby omitted.

Figure 8:
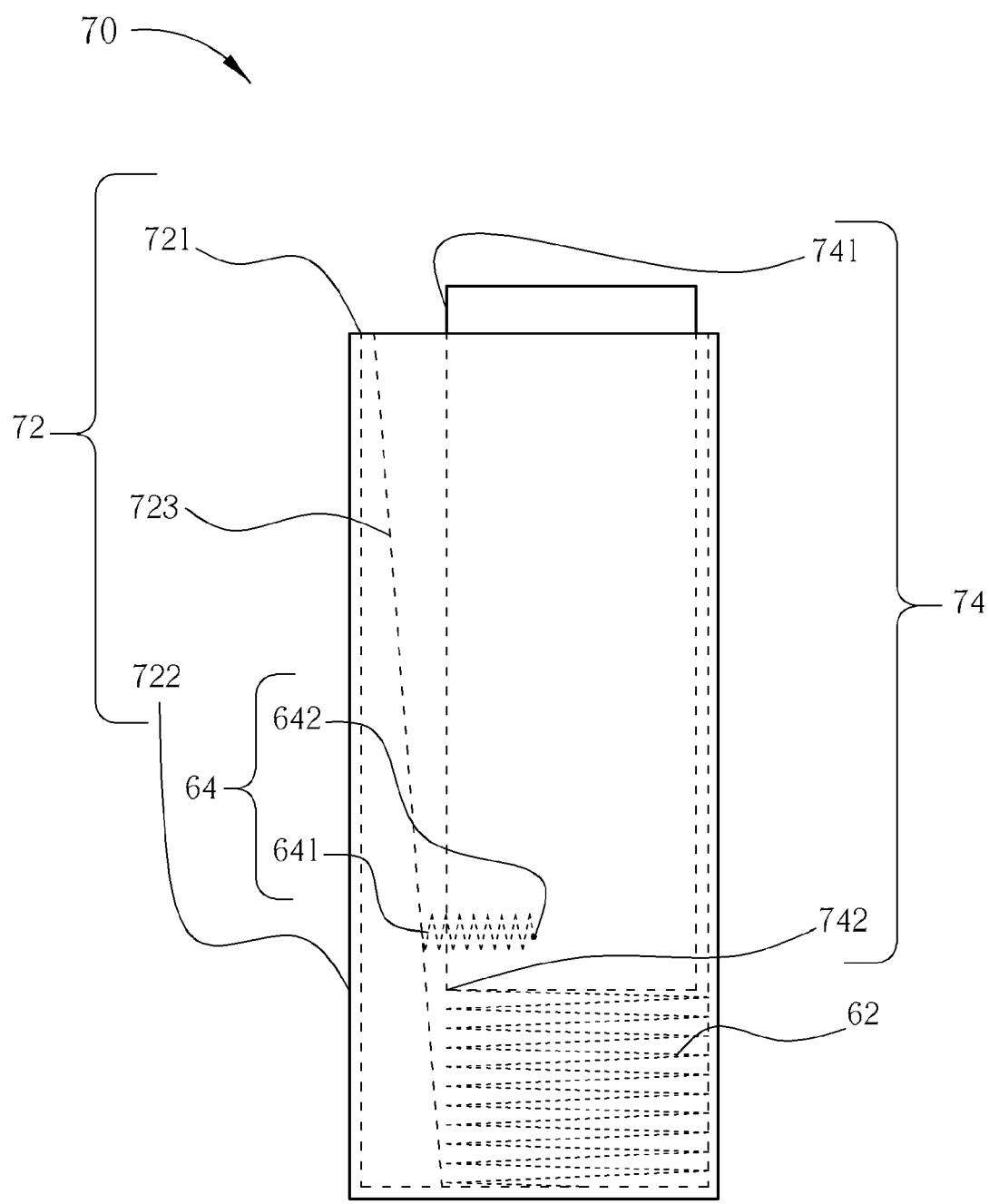
FIG. 8 and FIG. 9 are diagrams of an elevating mechanism located in the first position and the second position according to another embodiment of the present invention.
Figure 9:
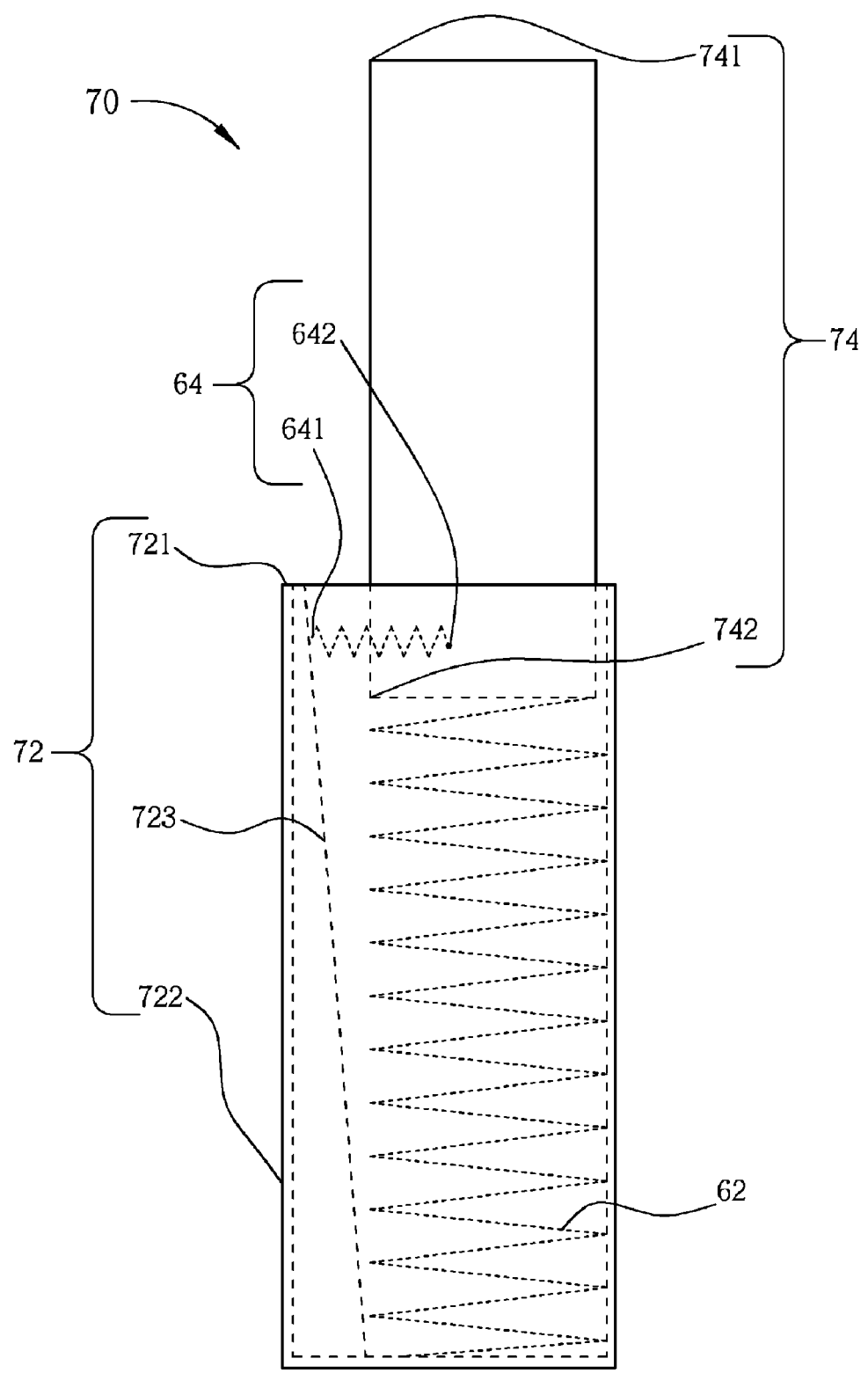

Please refer to FIG. 8 and FIG. 9. FIG. 8 and FIG. 9 are diagrams of an elevating mechanism 70 located in the first position and the second position according to another embodiment of the present invention. The elevating mechanism 70 includes a sleeve 72 having a first end 721 and a second end 722, and an elevating component 74 connected to the screen 52 and installed inside the sleeve 72 in a movable manner relative to the sleeve 72. The elevating component 74 has a third end 741 and a fourth end 742. A first distance between the first end 721 of the sleeve 72 and the third end 741 of the elevating component 74 is larger than a second distance between the second end 722 of the sleeve 72 and the fourth end 742 of the elevating component 74. The difference between this embodiment and the above-mentioned embodiment is that an incline 723 is disposed between the first end 721 and the second end 722 of the sleeve 72, and the inner width from the first end 721 to the second end 722 of the sleeve 72 is getting larger. The main spring 62 is also connected to the sleeve 72 and the elevating component 74, and the fifth end 641 of the complementary spring 64 contacts with the incline 723 of the sleeve 72 freely and the sixth end 642 of the complementary spring 64 is fixed on the elevating component 60.

As shown in FIG. 8, when the elevating component 74 descends to the first position relative to the sleeve 72, the main spring 62 is compressed at the first deformation and the complementary spring 64 is compressed at the third deformation. As shown in FIG. 9, when the elevating component 74 lifts to the second position relative to the sleeve 72, the main spring 62 is compressed at the second deformation and the complementary spring 64 is compressed at the fourth deformation. Because the main spring 62 and the complementary spring 64 are compressed relative to original conditions, the first deformation is larger than the second deformation of the main spring 62. Because the inner width of the sleeve 72 is getting larger from the top to the bottom thereof, that is, the inner width from the first end 721 to the second end 722 of the sleeve 72 is getting larger so that the first distance between the first end 721 of the sleeve 72 and the third end 741 of the elevating component 74 is larger than the second distance between the second end 722 of the sleeve 72 and the fourth end 742 of the elevating component 74 and the complementary spring 64 is disposed between the incline 723 of the sleeve 72 and the elevating component 74, the third deformation is larger than the fourth deformation of the complementary spring 64. In other words, when the elevating component 74 descends relative to the sleeve 72, the elastic deformations of the main spring 62 and the complementary spring 64 increase gradually. When the elevating component 74 lifts relative to the sleeve 72, the elastic deformations of the main spring 62 and the complementary spring 64 decrease gradually.

Similarly, when the elevating component 74 lifts from the first position shown in FIG. 8 to the second position shown in FIG. 9, the elastic restoring force of the main spring 62 decreases gradually and the elastic restoring force of the complementary spring 64 decreases simultaneously so that resistant force of lifting the elevating component 74 decrease so as to keep the external force for lifting the elevating component 74 constant. On the contrary, when the elevating component 74 descends from the second position shown in FIG. 9 to the first position shown in FIG. 8, the elastic restoring force of the main spring 62 increases gradually and the elastic restoring force of the complementary spring 64 increases simultaneously so that resistant force of descending the elevating component 74 increase so as to keep the external force F for descending the elevating component 74 constant. The friction force provided by the complementary spring 64 as an elasticity compensative mechanism for the elastic restoring force of the main spring 62 by synchronal change of the elastic restoring forces of the main spring 62 and the complementary spring 64 provides users for adjusting the height of the screen 52 with a constant force smoothly. Besides, a plurality of complementary springs can be used as the elasticity compensative mechanism, and another incline can be disposed on the opposite inner side with respect to the incline 723 of the sleeve 72 and the complementary springs 64 are installed on both sides of the elevating component 74 as the elasticity compensative mechanism. The working principle is the same as the above-mentioned embodiment, and detailed description is hereby omitted.

In conclusion, the preset invention utilizes the complementary spring having different deformations by relative movement of the sleeve and the elevating component so that the elastic restoring forces of the main spring and the complementary spring increase or decrease synchronously. The friction force provided by the complementary spring as the elasticity compensative mechanism for the elastic restoring force of the main spring provides users for adjusting the height of the screen with a constant force smoothly. Any mechanism for generating different deformations of the complementary spring by relative movement of the sleeve and the elevating component is within the scope of the present invention.

In contrast to the prior art, the elevating mechanism of the present invention utilizes synchronal change of the elastic restoring forces of the main spring and the complementary spring as the elasticity compensative mechanism for the elastic restoring force of the main spring provided by the friction force generated by the complementary spring so that users can adjust the height of the screen with a constant force smoothly. However mechanical design of the constant force spring 22 is complicated and cost of the constant force spring 22 is high. The present invention provides the mechanism for simulating the constant force spring with simply structure and low cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An elevating mechanism comprising:
  a sleeve comprising a first end and a second end;
  an elevating component installed inside the sleeve in a movable manner relative to the sleeve, the elevating component comprising a third end and a fourth end, a first distance between the first end of the sleeve and the third end of the elevating component being larger than a second distance between the second end of the sleeve and the fourth end of the elevating component;
  a main spring connected to the sleeve and the elevating component, the main spring being compressed by the elevating component at a first deformation when the elevating component is located in a first position relative to the sleeve, the main spring being compressed by the elevating component at a second deformation when the component is located in a second position relative to the sleeve, and the first deformation being larger than the second deformation; and
  a complementary spring comprising a fifth end contacting with an inner side of the sleeve and a sixth end contacting with the elevating component, the complementary spring being compressed at a third deformation when the elevating component is located in the first position relative to the sleeve, the complementary spring being compressed at a fourth deformation when the component is located in the second position relative to the sleeve, and the third deformation being greater than the fourth deformation.

2. The elevating mechanism of claim 1 wherein the main spring is a linear spring.

3. The elevating mechanism of claim 1 wherein the complementary spring is a linear spring.

4. The elevating mechanism of claim 1 wherein an incline is disposed between the third end and the fourth end of the elevating component, and the fifth end of the complementary spring is fixed on the inner side of the sleeve and the sixth end of the complementary spring contacts with the incline of the elevating component freely.

5. The elevating mechanism of claim 1 wherein an incline is disposed between the first end and the second end of the sleeve, and the fifth end of the complementary spring contacts with the inner side of the sleeve freely and the sixth end of the complementary spring is fixed on the elevating component.

6. A display device comprising:
   a screen;
   an elevating mechanism connected to the screen for elevating the screen, the elevating mechanism comprising:
      a sleeve comprising a first end and a second end;
      an elevating component installed inside the sleeve in a movable manner relative to the sleeve, the elevating component comprising a third end and a fourth end, a first distance between the first end of the sleeve and the third end of the elevating component being larger than a second distance between the second end of the sleeve and the fourth end of the elevating component;
      a main spring connected to the sleeve and the elevating component, the main spring being compressed by the elevating component at a first deformation when the elevating component is located in a first position relative to the sleeve, the main spring being compressed by the elevating component at a second deformation when the component is located in a second position relative to the sleeve, and the first deformation being larger than the second deformation; and
      a complementary spring comprising a fifth end contacting with an inner side of the sleeve and a sixth end contacting with the elevating component, the complementary spring being compressed at a third deformation when the elevating component is located in the first position relative to the sleeve, the complementary spring being compressed at a fourth deformation when the component is located in the second position relative to the sleeve, and the third deformation being greater than the fourth deformation.

7. The display device of claim 6 wherein the main spring is a linear spring.

8. The display device of claim 6 wherein the complementary spring is a linear spring.

9. The display device of claim 6 wherein an incline is disposed between the third end and the fourth end of the elevating component, and the fifth end of the complementary spring is fixed on the inner side of the sleeve and the sixth end of the complementary spring contacts with the incline of the elevating component freely.

10. The display device of claim 6 wherein an incline is disposed between the first end and the second end of the sleeve, and the fifth end of the complementary spring contacts with the inner side of the sleeve freely and the sixth end of the complementary spring is fixed on the elevating component.

11. The display device of claim 6 further comprising a base connected to the elevating mechanism.

* * * * *